United States Patent
Shao et al.

(10) Patent No.: US 11,734,850 B2
(45) Date of Patent: Aug. 22, 2023

(54) ON-FLOOR OBSTACLE DETECTION METHOD AND MOBILE MACHINE USING THE SAME

(71) Applicant: UBKang (Qingdao) Technology Co., Ltd., Qingdao (CN)

(72) Inventors: Dan Shao, San Gabriel, CA (US); Dejun Guo, San Gabriel, CA (US); Zhen Xiu, Chino Hills, CA (US); Chuqiao Dong, Pasadena, CA (US); Huan Tan, Pasadena, CA (US)

(73) Assignees: UBTECH NORTH AMERICA RESEARCH AND DEVELOPMENT CENTER CORP, Pasadena, CA (US); UBTECH ROBOTICS CORP LTD, Shenzhen (CN)

( * ) Notice: Subject to any disclaimer, the term of this patent is extended or adjusted under 35 U.S.C. 154(b) by 260 days.

(21) Appl. No.: 17/239,697

(22) Filed: Apr. 26, 2021

(65) Prior Publication Data
US 2022/0343530 A1    Oct. 27, 2022

(51) Int. Cl.
*G06T 7/70* (2017.01)
*G06T 7/50* (2017.01)
*G06T 7/194* (2017.01)
*G05D 1/02* (2020.01)

(52) U.S. Cl.
CPC ............ *G06T 7/70* (2017.01); *G05D 1/0251* (2013.01); *G06T 7/194* (2017.01); *G06T 7/50* (2017.01); *G06T 2207/10024* (2013.01); *G06T 2207/10028* (2013.01); *G06T 2207/30261* (2013.01)

(58) Field of Classification Search
CPC ... G06T 7/70; G06T 7/50; G06T 2207/10024; G06T 2207/10028
See application file for complete search history.

(56) References Cited

U.S. PATENT DOCUMENTS

2014/0363073 A1*  12/2014  Shirakyan ............... G06T 7/12
                                                      382/154
2022/0277469 A1*  9/2022   Wang ..................... G06T 7/70

FOREIGN PATENT DOCUMENTS

CN    110956137      *  4/2020  ............... G06N 3/08
CN    110956137 A       4/2020

OTHER PUBLICATIONS

ISR for POTICN2022/082148.
Written opinions of ISA for PCT/CN2022/082148.

* cited by examiner

*Primary Examiner* — Myron Wyche

(57) ABSTRACT

On-floor obstacle detection using an RGB-D camera is disclosed. An obstacle on a floor is detected by receiving an image including depth channel data and RGB channel data through the RGB-D camera, estimating a ground plane corresponding to the floor based on the depth channel data, obtaining a foreground of the image corresponding to the ground plane based on the depth channel data, performing a distribution modeling on the foreground of the image based on the RGB channel data to obtain a 2D location of the obstacle, and transforming the 2D location of the obstacle into a 3D location of the obstacle based on the depth channel data.

20 Claims, 9 Drawing Sheets

ON-FLOOR OBSTACLE DETECTION METHOD AND MOBILE MACHINE USING THE SAME

BACKGROUND

1. Technical Field

The present disclosure relates to obstacle detection, and particularly to an on-floor obstacle detection method and a mobile machine using the same.

2. Description of Related Art

Mobile machines such as mobile robots and vehicles are getting widely used with the maturation of artificial intelligence (A) techniques. Since the mobile machines usually have navigation capabilities to perform tasks such as movement and transportation, there is a need to realize obstacle avoidance so as to prevent the affections from obstacles, thereby guaranteeing the performance of the tasks.

In the existing obstacle avoidance techniques, conventional navigation sensor such as lidar, sonar and infrared (IR) sensor are used to detect obstacles. However, the sensors are often limited to the blind spot problem that the sensors cannot distinguish the presence of small (or tiny) obstacles from that of the ground, and they will report all the presence of objects including both obstacle and ground. Therefore, they have be mounted forwardly on the mobile machine to only sense the obstacle, without sensing the ground. That is to say, these sensors won't be able to cover small (or tiny) on-floor obstacles below their mount height.

On the contrary, RGB-D sensor (or camera) is economic while it can be mounted on the mobile machine to detect the forward ground, and its field of view can be ensured to be able to cover every portion where the mobile machine is marching to. Therefore, there's a possibility to realize better tiny and small on-floor obstacle detection using RGB-D sensor, if providing an algorithm that can distinguish obstacle versus background.

BRIEF DESCRIPTION OF THE DRAWINGS

In order to more clearly illustrate the technical solutions in this embodiment, the drawings used in the embodiments or the description of the prior art will be briefly introduced below. In the drawing(s), like reference numerals designate corresponding parts throughout the figures. It should be understood that, the drawings in the following description are only examples of the present disclosure. For those skilled in the art, other drawings can be obtained based on these drawings without creative works.

DETAILED DESCRIPTION

Figure 1A:
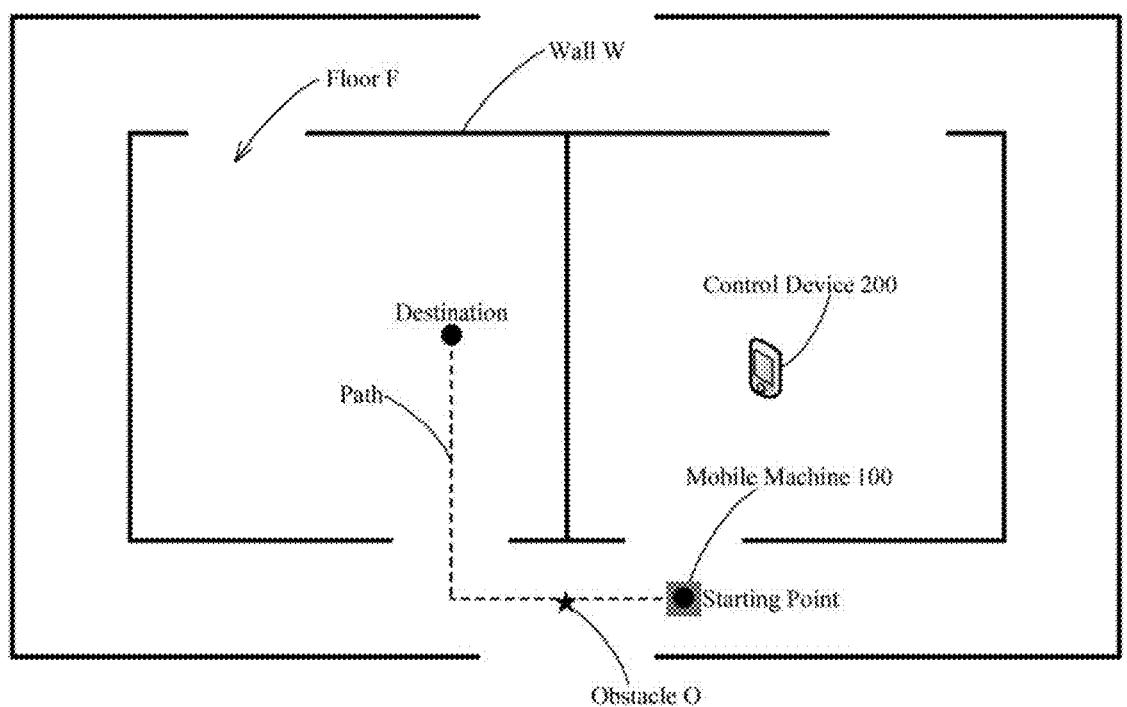
FIG. 1A is a schematic diagram of navigating a mobile machine according to some embodiments of the present disclosure.

In order to make the objects, features and advantages of the present disclosure more obvious and easy to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including", "comprising", "having" and their variations indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

In the present disclosure, the terms "first", "second", and "third" are for descriptive purposes only, and are not to be comprehended as indicating or implying the relative importance or implicitly indicating the amount of technical features indicated. Thus, the feature limited by "first". "second", and "third" may include at least one of the feature either explicitly or implicitly. In the description of the present disclosure, the meaning of "a plurality" is at least two, for example, two, three, and the like, unless specifically defined otherwise.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in other embodiments", "in other embodiments" and the like that appear in different places of the specification do not mean that descripted embodiments should be referred by all other embodiments, but instead be referred by "one or more but not all other embodiments" unless otherwise specifically emphasized.

The present disclosure relates to on-floor obstacle detection, which may be used by a mobile machine. As used herein, the term "mobile machine" refers to a machine such as a mobile robot or a vehicle that has the capability to move around in its environment, the term "obstacle" refers to an object on floor which may affect the movement of the mobile machine, the term "sensor" refers to a device, module, machine, or subsystem such as image sensor and gyroscope whose purpose is to detect events or changes in its environment and send the information to other electronics (e.g., processor), the term "navigation" refers to the process of monitoring and controlling the movement of a mobile machine from one place to another, and the term "collision avoidance" refers to prevent or reduce the severity of a collision during navigation.

FIG. 1A is a schematic diagram of navigating a mobile machine 100 according to some embodiments of the present disclosure. The mobile machine 100 (e.g., a mobile robot and a vehicle) is navigated in its environment (e.g., an office) to move on a floor F, while on-floor obstacle(s) O such as falling object, garbage, furniture, pet or the like (e.g., wall W) on the floor F are detected to prevent its movement from being affected, for example, obstructed, decelerated, tripped, or slipped, or to avoid dangerous situations such as collisions and falling down. In the indoor navigation, the mobile machine 100 is navigated from a starting point (e.g., the location where the mobile machine 100 is located) to a destination (e.g., the location of the goal of navigation which is indicated by the user or the navigation/operation system of the mobile machine 100) along a path therebetween while the obstacle(s) O on the floor F such as falling object, garbage and even wall has to be avoided. In some embodiments, for realizing the navigation of the mobile machine 100, the map for the environment has to be built, the position of the mobile machine 100 in the environment has to be determined, and the path for the mobile machine 100 to move from the starting point to the destination has to be planned.

In some embodiments, the navigation and/or an on-floor obstacle detection of the mobile machine 100 may be actuated through the mobile machine 100 itself (e.g., a control interface on the mobile machine 100) or a control device 200 such as a remote control of the mobile machine 100 by, for example, providing a request for the navigation and/or the on-floor obstacle detection of the mobile machine 100. The control device 200 may also be, for example, a smart phone, a tablet computer, a notebook computer, a desktop computer, or other electronic device.

Figure 1B:
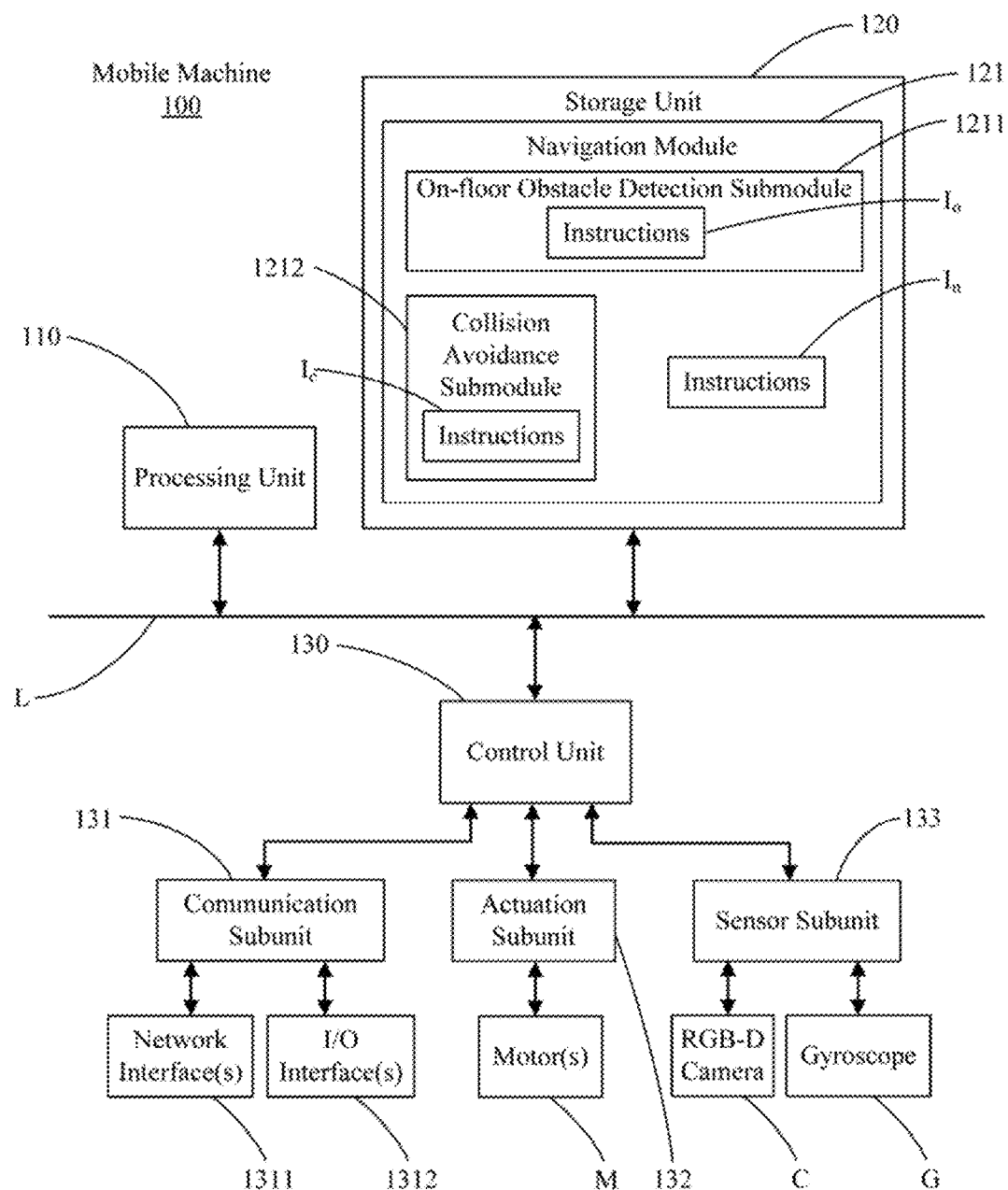
FIG. 1B is a schematic block diagram illustrating the mobile machine of FIG. 1A.

FIG. 1B is a schematic block diagram illustrating the mobile machine 100 of FIG. 1A. The mobile machine 100 may be a mobile robot such as a wheeled robot or a humanoid robot, which may include a processing unit 110, a storage unit 120, and a control unit 130 that communicate over one or more communication buses or signal lines L. It should be noted that, the mobile machine 100 is only one example of mobile machine, and the device 100 may have more or fewer components (e.g., unit, subunits, and modules) than shown in above or below, may combine two or more components, or may have a different configuration or arrangement of the components. The processing unit 110 executes various (sets of) instructions stored in the storage unit 120 that may be in form of software programs to perform various functions for the mobile machine 100 and to process related data, which may include one or more processors (e.g., CPU). The storage unit 120 may include one or more memories (e.g., high-speed random access memory (RAM) and non-transitory memory), one or more memory controllers, and one or more non-transitory computer readable storage mediums (e.g., solid-state drive (SSD) or hard disk drive). The control unit 130 may include various controllers (e.g., camera controller, display controller, and physical button controller) and peripherals interface for coupling the input and output peripheral of the mobile machine 100, for example, external port (e.g., USB), wireless communication circuit (e.g., RF communication circuit), audio circuit (e.g., speaker circuit), sensor (e.g., gyroscope and camera), and the like, to the processing unit 110 and the storage unit 120. In some embodiments, the storage unit 120 may include a navigation module 121 for implementing functions (e.g., map building, path planning, and on-floor obstacle detection) related to the navigation (and on-floor obstacle detection) of the mobile machine 100, which may be stored in the one or more memories (and the one or more non-transitory computer readable storage mediums). In other embodiments, the mobile machine 100 may be a vehicle such as a car.

The navigation module 121 in the storage unit 120 of the mobile machine 100 may be a software module (of the operation system of the mobile machine 100), which has instructions $I_n$ (e.g., instruction for actuating motor(s) M of the mobile machine 100 to move the mobile machine 100) for implementing the navigation of the mobile machine 100, an on-floor obstacle detection submodule 1211, and a collision avoidance submodule 1212. The on-floor obstacle detection submodule 1211 may be a software module having instructions $I_o$ for implementing the on-floor obstacle detection for the mobile machine 100 so as to detect on-floor obstacles. The collision avoidance submodule 1212 may be a software module having instructions $I_c$ for implementing the collision avoidance for the mobile machine 100 so as to avoid collision with obstacles. Each of the on-floor obstacle detection submodule 1211 and the collision avoidance submodule 1212 may be a submodule separated from the instructions $I_n$ or other submodules of the navigation module 121, or a part of the instructions $I_n$ for implementing the navigation of the mobile machine 100. The on-floor obstacle detection submodule 1211 may further have data (e.g., input/output data and temporary data) related to the on-floor obstacle detection of the mobile machine 100 which may be stored in the one or more memories and accessed by the processing unit 110. In some embodiments, the on-floor obstacle detection submodule 1211 may be a module in the storage unit 120 that is separated from the navigation module 121, or be integrated in the collision avoidance submodule 1212.

In some embodiments, the instructions $I_n$ may include instructions for implementing on-floor obstacle detection and collision avoidance of the mobile machine 100. In other embodiments, the navigation module 121 may be a navigation unit communicating with the processing unit 110, the storage unit 120, and the control unit 130 over the one or more communication buses or signal lines L, and may further include one or more memories (e.g., high-speed random access memory (RAM) and non-transitory memory) for storing the instructions $I_n$, the on-floor obstacle detection submodule 1211 and the collision avoidance submodule 1212, and one or more processors (e.g., MPU and MCU) for executing the stored instructions $I_n$, $I_o$, and $I_c$ to implement the navigation of the mobile machine 100.

The mobile machine 100 may further include a sensor subunit 133 which may include a set of sensor(s) and related controller(s), for example, an RGB-D camera C and a gyroscope G (or an inertial measurement unit (IMU)) for detecting the environment in which it is located to realize its navigation. The RGB-D camera C may be mounted in front of the mobile machine 100 to face the direction that the mobile machine 100 moves, so that its field of view V (see FIG. 2B) able to cover every portion where the mobile machine 100 is moving to. The sensor subunit 133 communicates with the control unit 130 over one or more communication buses or signal lines that may be the same or at least partially different from the above-mentioned one or more communication buses or signal lines L. In other embodiments, in the case that the navigation module 121 is the above-mentioned navigation unit, the sensor subunit 133 may communicate with the navigation unit over one or more communication buses or signal lines that may be the same or at least partially different from the above-mentioned one or more communication buses or signal lines L. In addition, the sensor subunit 133 may just abstract component for representing the logical relationships between the components of the mobile machine 100.

The mobile machine 100 may further include a communication subunit 131 and an actuation subunit 132. The communication subunit 131 and the actuation subunit 132 communicate with the control unit 130 over one or more communication buses or signal lines that may be the same or at least partially different from the above-mentioned one or more communication buses or signal lines L. The communication subunit 131 is coupled to communication interfaces of the mobile machine 100, for example, network interface (s) 1311 for the mobile machine 100 to communicate with the control device 200 via network(s) and I/O interface(s) 1312 (e.g., a physical button), and the like. The actuation subunit 132 is coupled to component(s)/device(s) for implementing the motions of the mobile machine 100 by, for example, actuating motor(s) M of wheels and/or joints of the mobile machine 100. The communication subunit 131 may include controllers for the above-mentioned communication interfaces of the mobile machine 100, and the actuation subunit 132 may include controller(s) for the above-mentioned component(s)/device(s) for implementing the motions of the mobile machine 100. In other embodiments, the communication subunit 131 and/or actuation subunit 132 may just abstract component for representing the logical relationships between the components of the mobile machine 100.

In some embodiments, the on-floor obstacle detection submodule 1211, the collision avoidance submodule 1212, the sensor subunit 133, and the motor(s) M (and wheels and/or joints of the mobile machine 100 coupled to the motor(s) M) jointly compose a (navigation) system which implements map building, (global and local) path planning, and motor actuating so as to realize the navigation of the mobile machine 100.

In some embodiments, the various components shown in FIG. 1B may be implemented in hardware, software or a combination of both hardware and software. Two or more of the processing unit 110, the storage unit 120, the control unit 130, the navigation module 121, and other units/subunits/modules may be implemented on a single chip or a circuit, in other embodiments, at least a part of them may be implemented on separate chips or circuits.

Figure 2A:
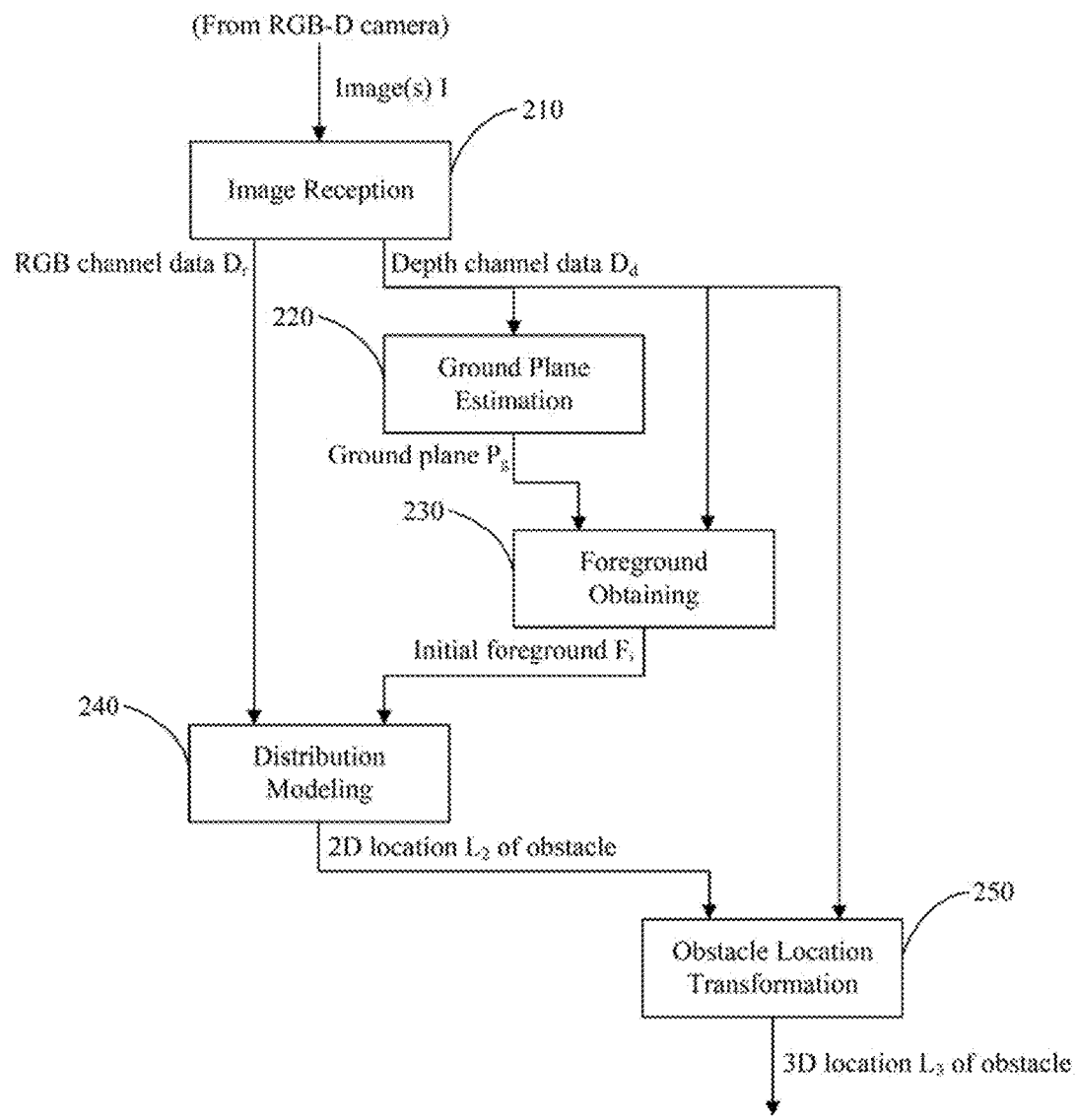
FIG. 2A is a schematic block diagram of an example of on-floor obstacle detection for the mobile machine of FIG. 1B.
Figure 2B:
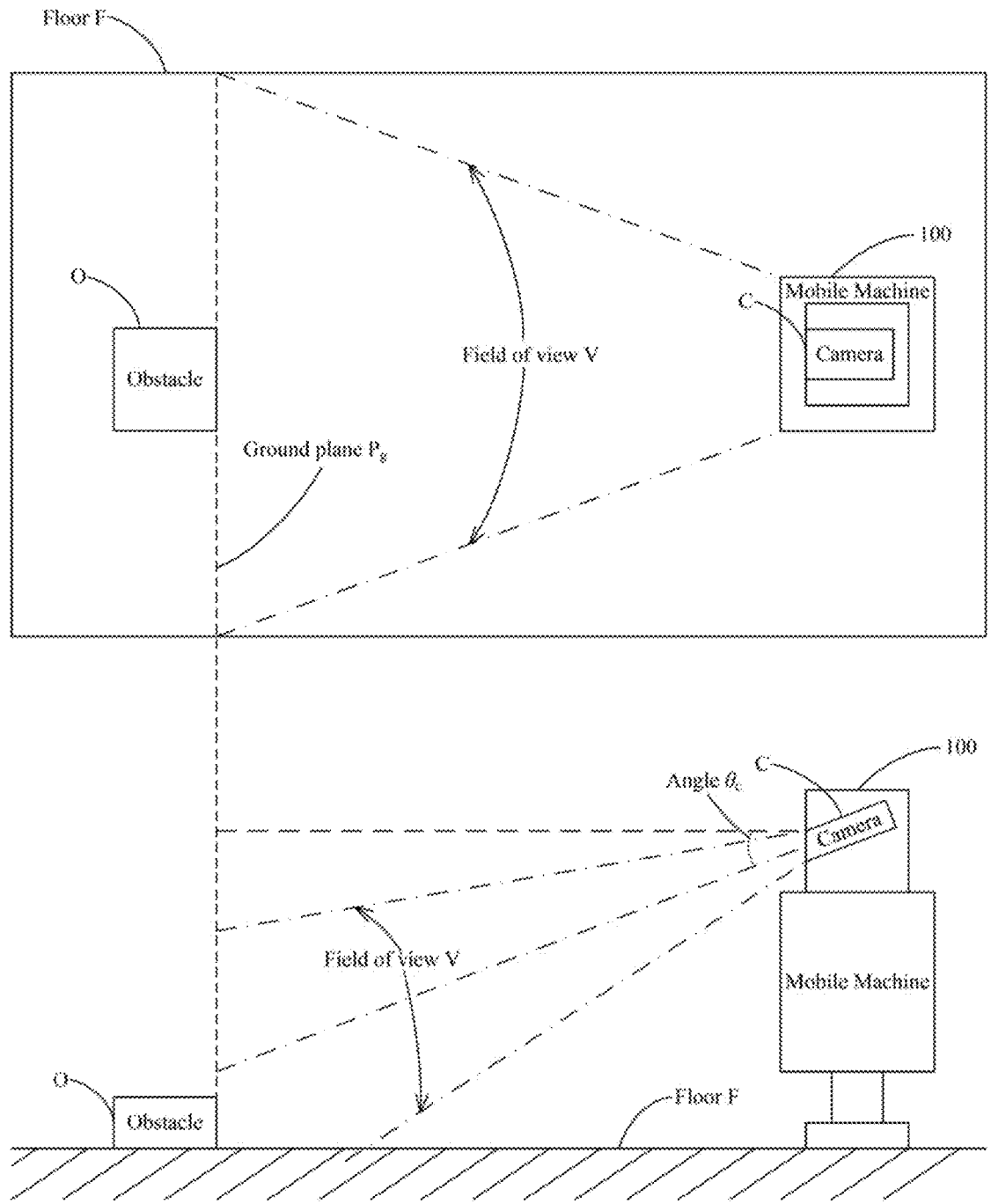
FIG. 2B is a schematic diagram of the on-floor obstacle detection of FIG. 2A.

FIG. 2A is a schematic block diagram of an example of on-floor obstacle detection for the mobile machine 100 of FIG. 1B. In some embodiments, an on-floor obstacle detection method for the mobile machine 100 is implemented in the mobile machine 100 to provide the on-floor obstacle detection of the mobile machine 100 by, for example, storing (sets of) instructions $I_o$, corresponding to the on-floor obstacle detection method as the on-floor obstacle detection submodule 1211 in the storage unit 120 and executing the stored instructions $I_o$ through the processing unit 110. The on-floor obstacle detection method may be performed in response to, for example, a request for the on-floor obstacle detection of the mobile machine 100 from, for example, (the navigation/operation system of) the mobile machine 100 itself or the control device 200. Then, the on-floor obstacle detection method may be re-performed, for example, at a specific interval (e.g., 1 second) and/or when the planned path is replanned until the navigation of the mobile machine 100 is ended. FIG. 2B is a schematic diagram of the on-floor obstacle detection of FIG. 2A. As shown in FIG. 2B, a field of view V of the RGB-D camera C covers both the on-floor obstacle O and the floor F. Through the on-floor obstacle detection, the obstacle O will be detected and the 3D location $L_3$ of the obstacle O will be obtained.

Figure 3:
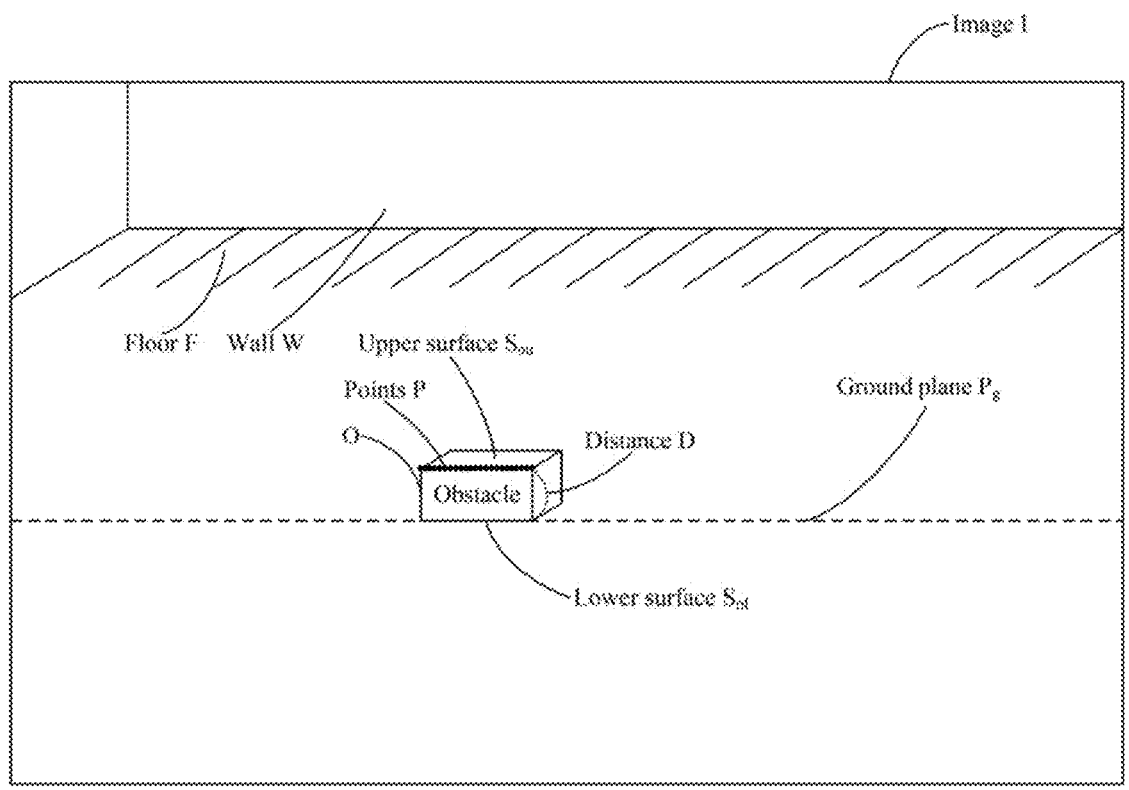
FIG. 3 is a schematic diagram of an image captured by the RGB-D camera of the mobile machine of FIG. 1B.

According to the on-floor obstacle detection method, the processing unit 110 receives image(s) I through the RGB-D camera C (block 210 of FIG. 2A). FIG. 3 is a schematic diagram of the image I captured by the RGB-D camera C of the mobile machine 100 of FIG. 11B. The image I is an image fora scene in the environment of FIG. 1A where the mobile machine 100 is navigated. The image I includes depth channel data $D_d$ and RGB channel data $D_r$. The depth channel data $D_d$ includes a depth channel of the image I that is for representing a distance to the scene object (e.g., the on-floor obstacle O, the floor F, and the wall W) in the image I, and the RGB channel data $D_r$ includes a red channel, a green channel, and a blue channel of the image I that are for representing the colors making up the image I.

Figure 4:
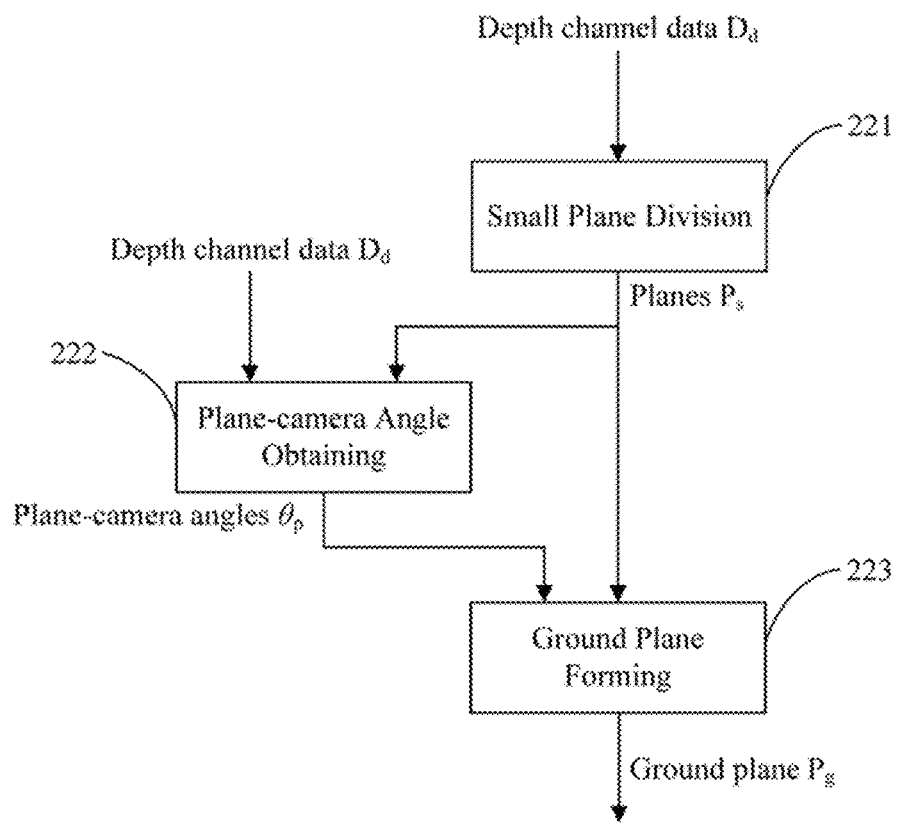
FIG. 4 is a schematic block diagram of an example of the ground plane estimation in the example of on-floor obstacle detection of FIG. 2A.

The processing unit 110 further estimates a ground plane $P_g$ corresponding to the floor F based on the depth channel data $D_d$ (block 220 of FIG. 2A). The ground plane $P_g$ is an estimated plane in the image I that represents the floor F on which the obstacle O is located. In some embodiments, in the case that a plurality of the images I are received, the ground plane $P_g$ may be estimated based on the depth channel data $D_d$ of the images I by, for example, estimating the ground plane $P_g$ for each image I and take one of the estimated ground planes $P_g$ (which, for example, appears in more than one image I). FIG. 4 is a schematic block diagram of an example of the ground plane estimation in the example of on-floor obstacle detection of FIG. 2A. In some embodiments, in the ground plane estimation (block 220 of FIG. 2A), as the full field of view of the RGB-D camera C contains large number of points in 3D space may include the foreground and the background, which do not belong to a single plane. Therefore, these points are divided in multiple small patches Ps where each patch of points representing a small area of the scene, that can always approximate representing a flat plane $P_s$ in the depth channel data $D_d$ (block 221 of FIG. 4). As an example, each of the plane-like cluster of point clouds (i.e., set of pixels) in the depth channel data $D_d$ are recognized as one plane $P_s$ based on the x and y coordinates in the coordinate system of the image I as well as the distance information in the depth channel data $D_d$ (i.e., the z coordinate in the coordinate system of the image I). The processing unit 110 further obtains an included angle $\theta_p$ (i.e., "plane-camera angle" in FIG. 5) of each of the plane(s) $P_s$ with respect to the RGB-D camera C based on the depth channel data $D_d$ (block 222 of FIG. 4). Then the ground plane $P_g$ can be computed by grouping the neighboring small patch planes Ps into a large plane based on the similarity of their angle and difference in height assuming all the small patch plane Ps belong to the floor F having similar angle between itself and at similar height relative to the RGB-D camera C. For example, when the floor has minor curvature or not perfectly smooth, as long as the neighboring small patches have similar included angle, they will be considered belonging to one larger plane. The angle of each small plane Ps can be computed from plane fitting process. A plane geometric model is described by a normal vector $n=[a, b, c]^T$ and a distance d so that for point $p=[x, y, z]^T$ on the plane Ps, $n \cdot p+d=0$. Given a set of points as input, it can resolve the normal vector n that satisfies majority of the points.

Figure 5:
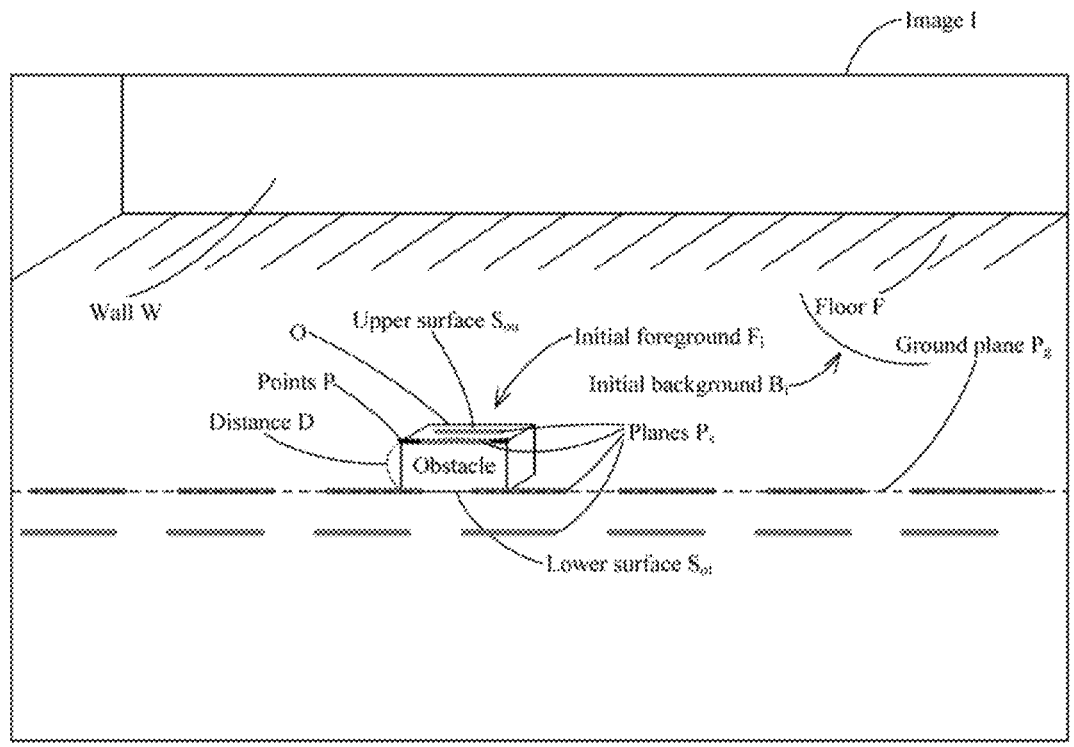
FIG. 5 is a schematic diagram of the ground plane estimation and the foreground obtaining in the example of on-floor obstacle detection of FIG. 2A.
Figure 5:
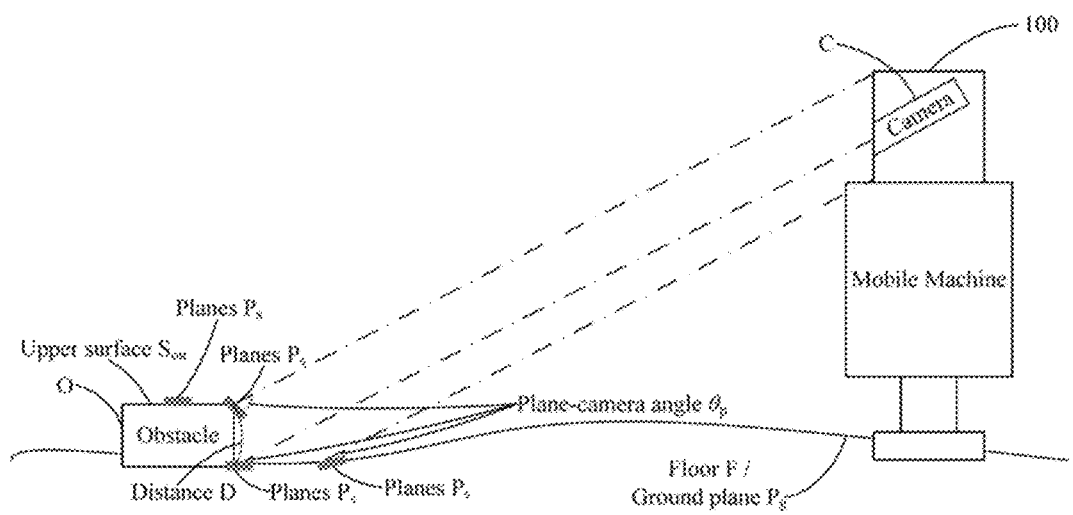

The processing unit 110 further finds ground plane Pg (see FIG. 5) in the depth channel data $D_d$ (block 223 of FIG. 4). FIG. 5 is a schematic diagram of the ground plane estimation and the foreground obtaining in the example of on-floor obstacle detection of FIG. 2A, where the ground plane $P_g$ is assumed to be the same as the floor F. $P_g$ is estimated as a so-called dominant plane in the field of view of camera C, meaning the largest connected plane in the scene. For better sensing the floor F when, for example, the RGB-D camera C has a larger height with respect to the floor F, instead of shooting forwards (i.e., in parallel with the floor F), the RGB-D camera C may have a downwards inclination angle $\theta_c$ to shoot with an inclination angle with respect to the floor F, therefore the dominant plane structure in the field of view is the ground/floor, not wall or other structure.

In some embodiments, the neighboring planes $P_s$ with similar included angles (for example, the neighboring planes $P_s$ that have the included angles with a difference not larger than a predetermined difference (e.g., 5 degrees), are connected as one single plane, and the largest connected single plane is taken as the ground plane $P_g$, with the included angle taken as an average value of all the connected small planes $P_s$ that belong to the ground plane $P_g$. As an example, the planes $P_s$ located in parallel with the lower surface $S_{ol}$ of the obstacle O are connected as a larger single plane while the planes $P_s$ located at the upper surface $S_{ou}$ of the obstacle O are connected as a smaller single plane or multiple planes if the upper surface $S_{on}$ has rich curvature, and the plane/planes at the upper surface $S_{ou}$ and the plane $P_s$ at the lower surface $S_{ol}$ are disconnected due to their large difference either in the included angle $\theta_p$, or in the relative height. The larger single plane connected through the planes $P_s$ in parallel with the lower surface $S_{ol}$ of the obstacle O will be taken as the ground plane $P_g$.

The processing unit 110 further obtains a foreground $F_i$ (i.e., initial foreground in FIG. 5) of the image I corresponding to the ground plane $P_g$ based on the depth channel data $D_d$ (block 230 of FIG. 2A). The location of (the pixels in) the foreground $F_i$ will be obtained. In some embodiments, in the case that a plurality of the images I are received (see block 210 of FIG. 2A), the foreground $F_i$ may be obtained based on the depth channel data $D_d$ of the images I by, for example, obtaining the ground plane $P_g$ for each image I and taking one of the (largest) obtained foreground $F_i$.

Figure 6:
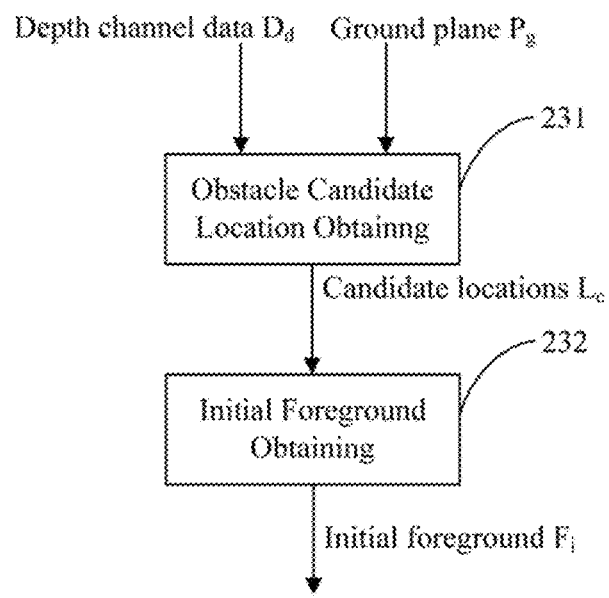
FIG. 6 is a schematic block diagram of an example of the foreground obtaining in the example of on-floor obstacle detection of FIG. 2A.

FIG. 6 is a schematic block diagram of an example of the foreground obtaining in the example of on-floor obstacle detection of FIG. 2A. In some embodiments, in the foreground obtaining (block 230), the processing unit 110 takes a position of each point P (see FIG. 5) in the depth channel data $D_d$ that is distant to the ground plane $P_g$ with at least a minimum distance (i.e., each point P with the distance from the ground plane $P_g$ that is larger than or equal to the minimum distance) (e.g., 1 cm) as a candidate location $L_c$ of the obstacle O (block 231). The candidate location $L_c$ may include the coordinates (e.g., Cartesian coordinate (x, y, z)) of each of the points P. The processing unit 110 further takes an area in the image I that corresponds to all the candidate locations $L_c$ of the obstacle O as the foreground $F_i$ of the image I (block 232). As an example, assuming that a distance D (see FIG. 5) between the points P and the ground plane $P_g$ is larger than the minimum distance, the positions of the points P are taken as the candidate locations $L_c$ of the obstacle O, and the area in the image I that corresponds to all the candidate locations $L_c$ of the obstacle O (i.e., the upper surface $S_{ou}$ of the obstacle O on which the points P are located and the upper part of the obstacle O adjacent to the upper surface $S_{ou}$) is taken as the foreground $F_i$ of the image I. In which, the distance D may be obtained based the distance between 3D location of the points P and the ground plane $P_g$.

In the foreground obtaining (block 230), a shape based method which based on the depth channel data $D_d$ is used to obtain the foreground $F_i$. It should be noted that, since the estimation of the location of the obstacle O based on the depth channel data D will be not robust due to the sensor noise of the RGB-D camera C, the foreground $F_i$ only serves as an initial foreground which will be redetermined in following step (see block 243 of FIG. 7).

The processing unit 110 further performs a distribution modeling on the foreground $F_i$ of the image I based on the RGB channel data $D_r$ to obtain a 2D location $L_2$ of the obstacle O (block 240 of FIG. 2A). In some embodiments, the distribution modeling is Gaussian distribution modeling, and the location of (the pixels in) the foreground $F_i$ is taken as the input to model the area out of the foreground $F_i$ as a background $B_i$ (see FIG. 5) using the RGB channel data $D_r$, so as to form multiple Gaussian distributions. The mixture Gaussian distribution modeling is also applied to the foreground $F_i$. The number of Gaussian models (e.g., 5 Gaussian distributions) may be tuned to achieve the balance between robustness and speed. In addition, in the case that a plurality of the images I are received (see block 220), because the distribution modeling is relatively time-consuming in comparison with other steps of the on-floor obstacle detection method (see block 210-block 230 and block 250 of FIG. 2A), the distribution modeling may be performed on the foreground $F_i$ of one of the images I to obtain a model for distinguishing the obstacle O, and the obtained model may be used to distinguish the obstacle O in the other of the images I.

Figure 7:
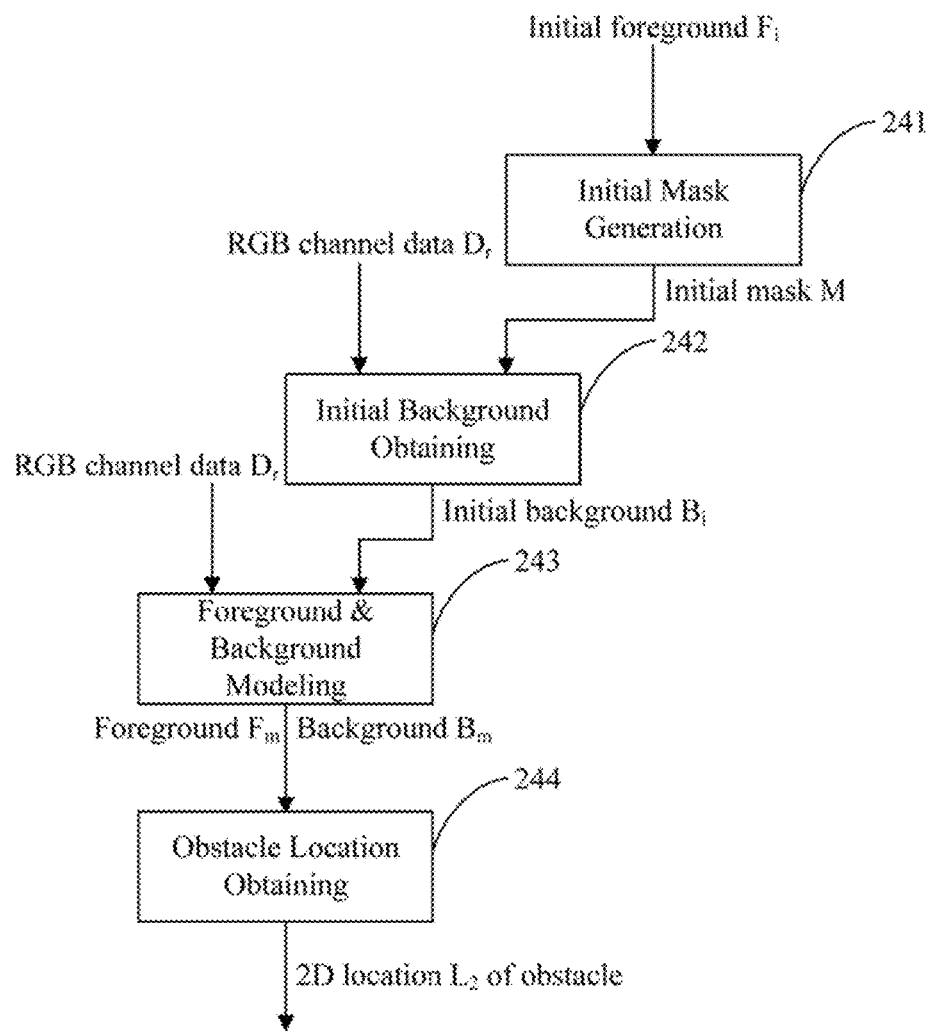
FIG. 7 is a schematic block diagram of an example of the distribution modeling in the example of on-floor obstacle detection of FIG. 2A.

FIG. 7 is a schematic block diagram of an example of the distribution modeling in the example of on-floor obstacle detection of FIG. 2A. In some embodiments, in the distribution modeling (block 240 of FIG. 2A), the processing unit 110 generates a mask M (i.e., initial mask) based on the foreground $F_i$ of the obstacle O (block 241). The processing unit 110 further obtains the background $B_i$ (i.e., initial background) of the image I using the mask M (block 242). The processing unit 110 further performs the distribution modeling on the foreground $F_i$ and the background $B_i$ of the image based on the RGB channel data to obtain a foreground $F_m$ after the distribution modeling (block 243). Each pixel of the image I may be matched to the Gaussian mixture model (GMM) of the foreground $F_i$ and the background $B_i$, and classify whether this pixel is closer to the foreground $F_i$ or to the background $B_i$ therefore to obtain the precise mask M of the obstacle O as the foreground $F_i$. In addition, a background $B_m$ after the distribution modeling is also obtained. The processing unit 110 further obtains the 2D location $L_2$ of the obstacle O based on the foreground $F_m$ (block 244).

In the distribution modeling (block 240), a texture (visual) based method which based on the RGB channel data $D_r$ is used to perform the distribution modeling on the foreground $F_i$ to obtain the foreground $F_m$, which has an improved robustness in estimating the location of the obstacle O than the above-mentioned shape based method. The shape based method (i.e., the foreground obtaining of block 230 of FIG.

2A) and the texture based method (i.e., the distribution modeling of block 240 of FIG. 2A) may be executed parallelly to optimize the calculation speed.

The processing unit 110 further transforms the 2D location $L_2$ of the obstacle O into the 3D location $L_3$ of the obstacle O based on the depth channel data $D_d$ (block 250 of FIG. 2A). In some embodiments, the 3D location $L_3$ of the obstacle O may be used to avoid the obstacle O by, for example, replanning the planned path to detour, so as to prevent the movement of the mobile machine 100 from being affected by the obstacle O.

The 3D location $L_3$ of the obstacle O obtained through the on-floor obstacle detection method may be used by the on-floor obstacle detection submodule 1211 to mark the obstacle O through, for example, an indicator (e.g., arrow, symbol, box, and mask) shown on the image I, or provided to other module/submodule (e.g., the collision avoidance submodule 1212) to realize collision avoidance. In some embodiments, the on-floor obstacle detection method further provides the point cloud of the foreground $F_m$ (for avoiding the obstacle O accordingly), a yes/no signal for the presence of the obstacle O (yes if the foreground $F_m$ is obtained, which is for avoiding the present obstacle O), and/or a plane formulation (i.e., distance and angle with respect to the RGB-D camera C) of the ground plane $P_g$.

In the on-floor obstacle detection method, on-floor obstacles are detected using one RGB-D camera. Unlike the existing obstacle avoidance techniques using other obstacle detection sensors such as lidar, sonar, and IR sensor which can't distinguish obstacle from ground, the method uses the RGB-D camera to cover the whole ground wherever the mobile machine is moving to. In addition, it requires no training data and labeling efforts (for obstacle and floor) when applied to an unknown environment, and improves the robustness in estimating the location of the obstacle by combining both shape and texture features of the obstacle as double verification to obtain the location of the obstacle. Furthermore, the calculation (and detection) speed can be optimized by paralleling the verifications based on shape and texture features. According to the experiments using the RealSense depth camera of type D435i, the algorithm of the on-floor obstacle detection method can detect any obstacle that is above 1 cm height (thin object such as carpet and curve that is lower than 1 cm height is considered as not obstacle) within 1.5 meters' distance. Because of its capability of detecting tiny/small obstacles, the on-floor obstacle detection method is capable of providing high safety feature to a mobile machine.

The on-floor obstacle detection method can be implemented on mobile machines that require (tiny/small) obstacle avoidance, or any computer vision application (e.g., ground hazard monitoring application) that requires to detect (tiny/small) objects on the ground surface.

It can be understood by those skilled in the art that, all or part of the method in the above-mentioned embodiment(s) can be implemented by one or more computer programs to instruct related hardware. In addition, the one or more programs can be stored in a non-transitory computer readable storage medium. When the one or more programs are executed, all or part of the corresponding method in the above-mentioned embodiment(s) is performed. Any reference to a storage, a memory, a database or other medium may include non-transitory and/or transitory memory. Non-transitory memory may include read only memory (ROM), programmable ROM (PROM), electrically programmable ROM (EPROM), electrically erasable programmable ROM (EEPROM), flash memory, solid-state drive (SSD), or the like. Volatile memory may include random access memory (RAM), external cache memory, or the like.

The processing unit 110 (and the above-mentioned processor) may include central processing unit (CPU), or be other general purpose processor, digital signal processor (DSP), application specific integrated circuit (ASIC), field-programmable gate array (FPGA), or be other programmable logic device, discrete gate, transistor logic device, and discrete hardware component. The general purpose processor may be microprocessor, or the processor may also be any conventional processor. The storage unit 120 (and the above-mentioned memory) may include internal storage unit such as hard disk and internal memory. The storage unit 120 may also include external storage device such as plug-in hard disk, smart media card (SMC), secure digital (SD) card, and flash card.

The exemplificative units/modules and methods/steps described in the embodiments may be implemented through software, hardware, or a combination of software and hardware. Whether these functions are implemented through software or hardware depends on the specific application and design constraints of the technical schemes. The above-mentioned on-floor obstacle detection method and mobile machine may be implemented in other manners. For example, the division of units/modules is merely a logical functional division, and other division manner may be used in actual implementations, that is, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

The above-mentioned embodiments are merely intended for describing but not for limiting the technical schemes of the present disclosure. Although the present disclosure is described in detail with reference to the above-mentioned embodiments, the technical schemes in each of the above-mentioned embodiments may still be modified, or some of the technical features may be equivalently replaced, so that these modifications or replacements do not make the essence of the corresponding technical schemes depart from the spirit and scope of the technical schemes of each of the embodiments of the present disclosure, and should be included within the scope of the present disclosure.

What is claimed is:

1. A method for detecting an obstacle on a floor using an RGB-D camera, comprising:

receiving an image through the RGB-D camera, wherein the image comprises depth channel data and RGB channel data;

estimating a ground plane corresponding to the floor based on the depth channel data;

obtaining a foreground of the image corresponding to the ground plane based on the depth channel data;

performing a distribution modeling on the foreground of the image based on the RGB channel data to obtain a 2D location of the obstacle; and transforming the 2D location of the obstacle into a 3D location of the obstacle based on the depth channel data;

wherein the obtaining the foreground of the image corresponding to the ground plane based on the depth channel data comprises:

taking a position of each point in the depth channel data distant to the ground plane with at least a minimum distance as a candidate location of the obstacle; and taking an area in the image corresponding to all the candidate locations of the obstacle as the foreground of the image.

2. The method of claim 1, wherein the estimating the ground plane corresponding to the floor based on the depth channel data comprises:

dividing a plurality of points in the depth channel data into one or more patches each representing a plane in the depth channel data;

obtaining an included angle of each of the one or more planes with respect to the RGB-D camera based on the depth channel data; and forming the ground plane corresponding to at least one of the one or more planes according to the included angle of the one or more planes.

3. The method of claim 2, wherein the obtaining the included angle of each of the one or more planes with respect to the RGB-D camera based on the depth channel data comprises:

obtaining the included angle between each of the one or more planes and the RGB-D camera through a normal vector of the plane, wherein the normal vector is obtained by fitting to pixels in the depth channel data.

4. The method of claim 2, wherein the forming the ground plane corresponding to at least one of the one or more planes according to the included angle of the one or more planes comprises:

connecting the neighboring planes as a single plane, wherein a difference between the included angles of the neighboring planes is not larger than a predetermined difference; and taking the largest single plane as the ground plane.

5. The method of claim 1, wherein the performing the distribution modeling on the foreground of the image based on the RGB channel data to obtain the 2D location of the obstacle comprises:

generating a mask based on the foreground of the obstacle;

obtaining a background of the image using the mask;

performing the distribution modeling on the foreground and the background of the image based on the RGB channel data; and obtaining the 2D location of the obstacle based on the foreground of the image.

6. The method of claim 1, wherein the 3D location comprises a plurality of coordinates corresponding to the obstacle.

7. A mobile machine, comprising:

an RGB-D camera;

one or more processors; and one or more memories storing one or more programs configured to be executed by the one or more processors, wherein the one or more programs comprise instructions to:

receive an image through the RGB-D camera, wherein the image comprises depth channel data and RGB channel data;

estimate a ground plane corresponding to the floor based on the depth channel data;

obtain a foreground of the image corresponding to the ground plane based on the depth channel data;

perform a distribution modeling on the foreground of the image based on the RGB channel data to obtain a 2D location of the obstacle; and transform the 2D location of the obstacle into a 3D location of the obstacle based on the depth channel data;

wherein the performing the distribution modeling on the foreground of the image based on the RGB channel data to obtain the 2D location of the obstacle comprises:

generating a mask based on the foreground of the obstacle;

obtaining a background of the image using the mask;

performing the distribution modeling on the foreground and the background of the image based on the RGB channel data; and obtaining the 2D location of the obstacle based on the foreground of the image.

8. The mobile machine of claim 7, wherein the estimating the ground plane corresponding to the floor based on the depth channel data comprises:

dividing a plurality of points in the depth channel data into one or more patches each representing a plane in the depth channel data;

obtaining an included angle of each of the one or more planes with respect to the RGB-D camera based on the depth channel data; and forming the ground plane corresponding to at least one of the one or more planes according to the included angle of the one or more planes.

9. The mobile machine of claim 8, wherein the obtaining the included angle of each of the one or more planes with respect to the RGB-D camera based on the depth channel data comprises:

obtaining the included angle between each of the one or more planes and the RGB-D camera through a normal vector of the plane, wherein the normal vector is obtained by fitting to pixels in the depth channel data.

10. The mobile machine of claim 8, wherein the forming the ground plane corresponding to at least one of the one or more planes according to the included angle of the one or more planes comprises:

connecting the neighboring planes as a single plane, wherein a difference between the included angles of the neighboring planes is not larger than a predetermined difference; and taking the largest single plane as the ground plane.

11. The mobile machine of claim 7, wherein the obtaining the foreground of the image corresponding to the ground plane based on the depth channel data comprises:

taking a position of each point in the depth channel data distant to the ground plane with at least a minimum distance as a candidate location of the obstacle; and taking an area in the image corresponding to all the candidate locations of the obstacle as the foreground of the image.

12. The mobile machine of claim 7, wherein the 3D location comprises a plurality of coordinates corresponding to the obstacle.

13. A non-transitory computer readable storage medium storing one or more programs, wherein the one or more programs comprise instructions, which when executed by a mobile machine having a plurality of sensors, cause the mobile machine to:

receive an image through the RGB-D camera, wherein the image comprises depth channel data and RGB channel data;

estimate a ground plane corresponding to the floor based on the depth channel data;

obtain a foreground of the image corresponding to the ground plane based on the depth channel data;

perform a distribution modeling on the foreground of the image based on the RGB channel data to obtain a 2D location of the obstacle; and transform the 2D location of the obstacle into a 3D location of the obstacle based on the depth channel data;

wherein the obtaining the foreground of the image corresponding to the ground plane based on the depth channel data comprises:

taking a position of each point in the depth channel data distant to the ground plane with at least a minimum distance as a candidate location of the obstacle; and taking an area in the image corresponding to all the candidate locations of the obstacle as the foreground of the image.

14. The storage medium of claim 13, wherein the estimating the ground plane corresponding to the floor based on the depth channel data comprises:

dividing a plurality of points in the depth channel data into one or more patches each representing a plane in the depth channel data;

obtaining an included angle of each of the one or more planes with respect to the RGB-D camera based on the depth channel data; and forming the ground plane corresponding to at least one of the one or more planes according to the included angle of the one or more planes.

15. The storage medium of claim 14, wherein the obtaining the included angle of each of the one or more planes with respect to the RGB-D camera based on the depth channel data comprises:

obtaining the included angle between each of the one or more planes and the RGB-D camera through a normal vector of the plane, wherein the normal vector is obtained by fitting to pixels in the depth channel data.

16. The storage medium of claim 14, wherein the forming the ground plane corresponding to at least one of the one or more planes according to the included angle of the one or more planes comprises:

connecting the neighboring planes as a single plane, wherein a difference between the included angles of the neighboring planes is not larger than a predetermined difference; and taking the largest single plane as the ground plane.

17. The storage medium of claim 13, wherein the performing the distribution modeling on the foreground of the image based on the RGB channel data to obtain the 2D location of the obstacle comprises:

generating a mask based on the foreground of the obstacle;

obtaining a background of the image using the mask;

performing the distribution modeling on the foreground and the background of the image based on the RGB channel data; and obtaining the 2D location of the obstacle based on the foreground of the image.

18. The storage medium of claim 17, wherein a texture based method is used to perform the distribution modeling on the foreground of the image based on the RGB channel data.

19. The storage medium of claim 13, wherein the 3D location comprises a plurality of coordinates corresponding to the obstacle.

20. The method of claim 5, wherein a texture based method is used to perform the distribution modeling on the foreground of the image based on the RGB channel data.

* * * * *